United States Patent
Baker et al.

[11] Patent Number: 5,902,629
[45] Date of Patent: May 11, 1999

[54] METHOD FOR PROCESSING GRAIN AND LEGUME FULLY-COOKED POWDERS AND SNACKS

[76] Inventors: Randall A. Baker, Rt. 1, Box 28-B, Eagle, Nebr. 68347-9606; Rebecca R. Krueger, Rt. 1, Box 79, Roca, Nebr. 68430

[21] Appl. No.: 08/796,076

[22] Filed: Feb. 5, 1997

Related U.S. Application Data

[60] Provisional application No. 60/011,102, Feb. 5, 1996.

[51] Int. Cl.$^6$ .............................. A23L 1/20; A23L 1/00; A23B 4/03; A23B 6/00
[52] U.S. Cl. ..................... 426/634; 426/445; 426/506; 426/507
[58] Field of Search ................................ 426/634, 506, 426/507, 508, 516, 445, 447

[56] References Cited

U.S. PATENT DOCUMENTS

| | | |
|---|---|---|
| D. 328,003 | 7/1992 | Matson et al. . |
| 3,870,805 | 3/1975 | Hayes et al. ............................. 426/506 |
| 4,185,123 | 1/1980 | Wenger et al. ......................... 426/506 |
| 4,939,346 | 7/1990 | Bailey et al. . |
| 5,023,429 | 6/1991 | Bailey et al. . |
| 5,024,145 | 6/1991 | Bailey et al. . |
| 5,151,285 | 9/1992 | Williams et al. . |
| 5,189,809 | 3/1993 | Bailey et al. . |
| 5,213,831 | 5/1993 | Leggott et al. . |
| 5,392,529 | 2/1995 | Bailey et al. . |

*Primary Examiner*—Anthony J. Weier
*Attorney, Agent, or Firm*—Litman, Kraai and Brown L.L.C.

[57] ABSTRACT

Grain or legume material is precooked by a low moisture process and preconditioned by hydrating to a total moisture content of from about 10% to about 40% by weight, passed through a cooking extruder and, during such passage, hydrated to a total moisture content of from about 10% to about 40% by weight, extruded and dried. The products of the invention are crisp curls, puffs and chips. The extruded cooked material may also be ground and agglomerated to prepare powders which will not cake or lump.

19 Claims, 1 Drawing Sheet

METHOD FOR PROCESSING GRAIN AND LEGUME FULLY-COOKED POWDERS AND SNACKS

CROSS REFERENCE TO RELATED APPLICATION

This application is a non-provisional application based on Provisional application Ser. No. 60/011,102, filed Feb. 5, 1996, and entitled PROCESSING METHOD OF GRAIN AND LEGUME COOKED POWDERS AND SNACKS. The subject matter of the prior patent application is expressly incorporated herein by reference.

BACKGROUND OF THE INVENTION

1. Field of the Invention

The present invention is broadly concerned with an improved, energy-efficient method for cooking and processing cereal grains and legumes into full-flavored powders, chunks and snack foods. More particularly, the invention is concerned with such a method in which the grain, bean, pea or lentil is precooked, minimally hydrated, extruded, and dried to a predetermined moisture level. Advantageously, all varieties of grains and dry edible beans, peas and lentils may be processed and the resulting cooked products have superior organoleptic properties.

2. Description of the Related Art

Beans, and legumes are cooked and powdered in order to prepare convenience foods, such as instant soups and stews and bean dips, as well as snack products, such as chips. In conventional processes for making instant bean powders, the beans are sorted and cooked by boiling in water, then dehydrated on a drum dryer and ground to a fine powder. Because such processes generate waste cooking water and require an extra dehydration step to remove the excess moisture absorbed during vat cooking, they are energy intensive, and thus more expensive.

Such vat-cooked and drum-dried instant bean powders also typically present poor flavor profiles when compared with freshly cooked bean products. In effect, the boiling water used in vat cooking extracts from the beans the volatile compounds which impart their distinctive flavor. The full bean flavor is lost when the cooking water is discarded. In addition, an overcooked taste is generally imparted because the beans are actually cooked twice, once by boiling in the vat, and again by the drum dryer. Not infrequently, the drum dryer imparts a bitter, charred flavor as well.

SUMMARY OF THE INVENTION

The present invention overcomes the problems outlined above, and provides a greatly improved and energy efficient method for processing grains and legumes into flavorful, fully-cooked powders and snacks. The grain or legume material is precooked by a low moisture process and preconditioned by hydrating to a total moisture content of from about 10% to about 40% by weight, passed through a cooking extruder and, during such passage, hydrated to a total moisture content of from about 10% to about 40% by weight, extruded and dried. The products of the invention are crisp curls, puffs and chips. The extruded cooked material may also be ground and agglomerated to prepare powders which will not cake or lump.

Objects and Advantages of the Invention

The principal objects and advantages of the present invention include providing a method for processing grain and legume cooked powders and snacks and the products of such a method having superior organoleptic properties, providing such a method and products which do not have an overcooked, charred flavor; providing such a method and products which can employ all varieties of beans and grains; providing such a method and products which retain the full flavor of the food material; providing such a method and products which do not require dehydration following precooking; providing such a method which is energy efficient; providing such products which rehydrate instantly; providing such a method and products which are economical; providing such a method and products which are particularly well-adapted for instant rehydration; providing such a method which employs infrared energy for precooking; providing such a method and products which have a long shelf life.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE PREFERRED EMBODIMENTS

Figure 1:
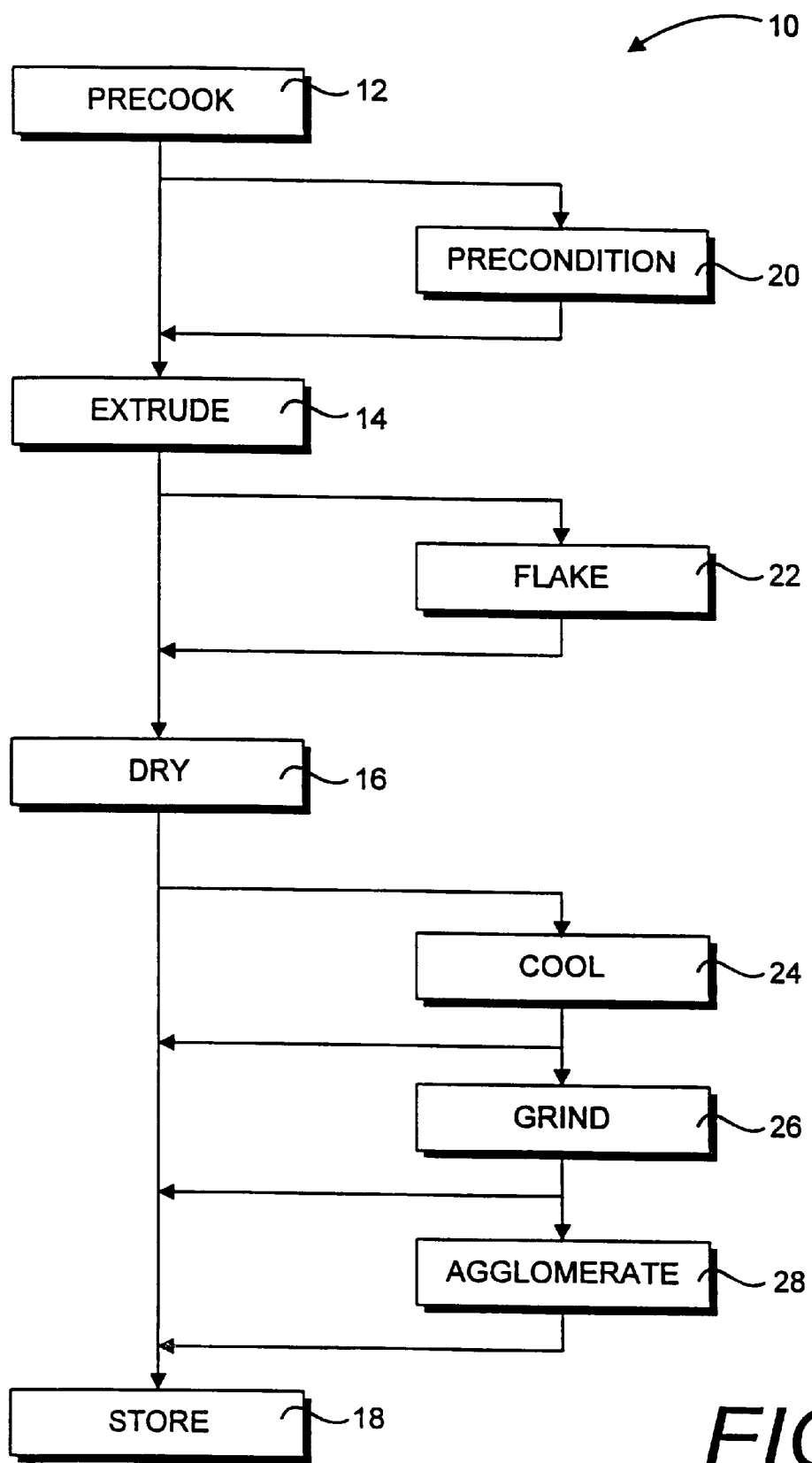
FIG. 1 depicts a schematic view showing the steps of a method of processing grains and legumes in accordance with the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

I. Introduction and Environment

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring now to the drawing, a method for processing grains and legumes 10 in accordance with the invention broadly includes the steps of precooking the material 12, extrusion 14, drying 16 and storage 18.

II. Method for Processing Grain and Legume Cooked Powders and Snacks

In more detail, any variety of grain or of dry edible beans, peas and lentils may be precooked 12. Particularly preferred powders and snacks are made from pintos, Great Northern beans, navy beans, small reds, blacks, pinks, kidneys and lima beans.

The precooking 12 may employ one or more of the processes described in U.S. Pat. Nos. 4,939,346; 5,023,429; 5,024,145; 5,151,285; 5,189,809; 5,213,831 and 5,392,529, which are incorporated herein by reference. The material may also be precooked using any other suitable low-moisture cooking method. U.S. Pat. No. 5,213,831 describes a particularly preferred method for cooking legumes which employs infrared energy. Such cooked legumes are characterized as having a moisture content after precooking of from about 5% to about 10% by weight.

Additional ingredients may be added during precooking 12, such as, for example, spices and seasonings, oils, and various processing aids such as chemical additives which affect functionality and shelf life.

The precooked material 12 may be ground and provided as flour, granules, flakes, pieces or a blend of the three. Because the precooked material 12 is so low in moisture, no dehydration step is necessary prior to preconditioning 20. The precooked material 12 is then preconditioned 20 by hydrating and mixing in a ribbon blender or a preconditioning cylinder which may be part of an extrusion system. The mixture is hydrated by subjecting the precooked material 12 to water or steam until it reaches a moisture content of from about 10% to about 40% by weight.

The preconditioned material 20 is then fed immediately into the inlet of an extruder, where it is further cooked. Water may be added to the barrel to hydrate the mixture to a total moisture content of from about 10% to about 40% by weight. The preferred extruder has a screw and die configuration calculated to maximize cooking of the product without scorching. The extruded, cooked product is cut by a rotating knife, the speed of which can be varied to obtain the preferred product size and shape.

In preferred methods the extrudate 14 is flaked 22 by a heavy duty roller mill or flaking rolls. The roller mill gap settings may be adjusted to achieve the desired product, depending on the variety of bean or grain processed, the desired product size and finished product appearance and cook time.

The cut extrudate is then dried 16, preferably by apparatus which employs heated air or a combination of infrared radiation and air. A multiple-stage dryer having variable drying conditions may be employed, although any other suitable drying means may be employed. The final product will have a moisture content of from about 5% to about 15%, depending upon the desired characteristics of the finished product.

Following drying 16, the product may be cooled 24 to achieve a product temperature which is suitable for either grinding or storage. If the temperature of the dried product 16 is within an acceptable range, it may be stored 18 directly, without cooling 24.

Following cooling 24, the product may be ground through a hammer mill or any other grinding system to reduce particle size. The final particle size may be adjusted to optimize water uptake, finished product viscosity and organoleptic qualities.

The ground product 26 may be agglomerated 28 in order to reduce dust, caking and lumping problems. The ground product is fed into an agglomerator and water and/or steam and/or a binder such as starch, modified starch, gums, or other suitable binders are added. The mixture is then dried to a moisture content of from about 5% to about 15% by weight.

The product may be stored 18 in bulk or packaged in preset quantities and then stored until consumed.

III. Finished Product Usage

The grains and legumes processed according to the method previously described are economical and are particularly well adapted to quick cooking. The bean powders may be instantly rehydrated with hot or cold water to make instant or quick cook beans and bean dips. They may also be incorporated into instant or quick cook soups and stews which are rehydrated with hot water. Similarly, grain powders may be instantly rehydrated with hot water to make popular instant breakfast cereals.

Both extruded grain and bean products in the form of crunchy curls, puffs and chips, may be eaten as snack foods, or may be further toasted to enhance crispness.

EXAMPLE I

An instant pinto bean powder is prepared according to the method of the invention. Pinto bean powder precooked material is prepared according to the method set forth in U.S. Pat. No. 5,213,831. The precooked powder is conveyed into the conditioning cylinder of a conventional cooker-extruder, is hydrated with water and extruded. The moisture content of the extruded product is controlled to from about 10% to about 40% by weight by addition of steam in the preconditioning cylinder and again in the barrel during extrusion. The barrel is then heated to cook the product to at least about 95% starch gelatinization and an acceptable cooked flavor and color. The cooked pinto bean extrudate is cut into pellets by a rotating knife as it emerges from the endmost extruder die, and is conveyed through a dryer. The dried extrudate is conveyed to a cooler for a period of about two hours. The final moisture content of the pinto bean product following drying and cooling is between 8% and 10% by weight. The dried pellets of extrudate are then ground, and supplied as an ingredient for various instant foods such as instant soup cups, quick-cooking refried beans, and bean dips.

It is to be understood that while certain forms of the present invention have been illustrated and described herein, it is not to be limited to the specific forms or arrangement of parts described and shown.

Having described the preferred embodiments of the present invention, the following is claimed as new and desired to be secured by Letters Patent:

1. A method for processing a food material into a cooked powder or snack product, comprising the steps of:

(a) precooking the material by energizing the food material with energy in an infrared range sufficient to partially cook the material and reduce the total moisture content of the food material to about 5% to about 10%;

(b) preconditioning the material by hydrating the material to a total moisture content of from about 10% to about 40% by weight;

(c) passing the material into and through an extruder, and during such passage cooking the material;

(d) extruding the material to form an expanded cellular extrudate; and (e) drying said extrudate to a total moisture content of about 5% to about 15% by weight.

2. The method as set forth in claim 1, further including the step of selecting a food material from the group consisting of grains, edible beans, peas, lentils and mixtures thereof.

3. The method as set forth in claim 1, further including the step of adding a supplemental ingredient selected from the group consisting of seasonings, oil and processing aids, mixtures thereof.

4. The method as set forth in claim 1, wherein the precooking of step (a) reduces the total moisture content of the food material to about 5% to about 10%.

5. The method as set forth in claim 1, wherein after step (a) and before step (b) the material is preconditioned by hydrating to a total moisture content of from about 10% to about 40% by weight.

6. The method as set forth in claim 1, wherein step (a) comprises energizing the food material with energy in the infrared range sufficient to partially cook the material.

7. The method as set forth in claim 1, wherein the material is cooked in step (b) until at least about 95% of the starch is gelatinized.

8. The method as set forth in claim 1, further including the steps of:

(e) after step (c), flaking said extrudate;

(f) after step (d), cooling said extrudate;

(g) grinding said extrudate to form a powder; and (h) agglomerating the powder.

9. The method as set forth in claim 1, the powder having a final moisture content of from about 5% to about 15% by weight.

10. A method for processing a a starch-containing food material selected from the group consisting of grains, edible beans, peas, lentils and mixtures thereof into a cooked powder or snack product, comprising the steps of:

(a) precooking the material by energizing the food material with energy in an infrared range sufficient to partially cook the material and reduce the total moisture content of the food material to about 5% to about 10%;

(b) preconditioning the material by hydrating the material to a total moisture content of from about 10% to about 40% by weight;

(c) passing the precooked and preconditioned material into and through an extruder and, during such passage, cooking the material;

(d) extruding the material to form an expanded cellular extrudate; and (e) drying said extrudate to a total moisture content of about 5% to about 15% by weight.

11. The method as set forth in claim 10, further including the step of selecting a food material from the group consisting of grains, edible beans, peas, lentils and mixtures thereof.

12. The method as set forth in claim 10, further including the step of adding a supplemental ingredient selected from the group consisting of seasonings, oil and processing aids, mixtures thereof.

13. The method as set forth in claim 10, wherein precooking in step (a) reduces the total moisture content of the food material to about 5% to about 10%.

14. The method as set forth in claim 10, wherein step (a) comprises energizing the food material with energy in an infrared range sufficient to partially cook the material.

15. The method as set forth in claim 10, wherein the material is cooked in step (c) until at least about 95% of the starch is gelatinized.

16. The method as set forth in claim 10, further including the steps of:

(f) after step (d), flaking said extrudate;

(g) after step (e), cooling said extrudate;

(h) grinding said extrudate to form a powder; and (i) agglomerating the powder.

17. The method as set forth in claim 10, the powder having a final moisture content of from about 5% to about 15% by weight.

18. A method for processing a starch-containing food material selected from the group consisting of grains, edible beans, peas, lentils and mixtures thereof into a cooked powder or snack product, comprising the steps of:

(a) precooking by energizing the food material with energy in an infrared range sufficient to partially cook the material and reduce the total moisture content of the food material to about 5% to about 10%;

(b) preconditioning the material by hydrating the material to a total moisture content of from about 10% to about 40% by weight;

(c) passing the material into and through an extruder and, during such passage, subjecting the material to an elevated cooking temperature until at least about 95% of the starch is gelatinized;

(d) extruding the material to form an expanded cellular extrudate;

(e) flaking said extrudate;

(f) drying said extrudate to a total moisture content of about 5% to about 15% by weight;

(g) cooling said extrudate;

(h) grinding said extrudate to form a powder; and (i) agglomerating the powder.

19. The method as set forth in claim 18, further including the step of adding an ingredient selected from the group consisting of seasonings, oil, processing aids and mixtures thereof.

* * * * *